(12) United States Patent
Spencer

(10) Patent No.: US 8,567,327 B1
(45) Date of Patent: Oct. 29, 2013

(54) MANUALLY OPERATED SEEDING DEVICE AND ASSOCIATED METHODS

(76) Inventor: Sam Spencer, Bluffdale, UT (US)

( * ) Notice: Subject to any disclaimer, the term of this patent is extended or adjusted under 35 U.S.C. 154(b) by 385 days.

(21) Appl. No.: 12/901,152

(22) Filed: Oct. 8, 2010

(51) Int. Cl.
*A01C 5/02* (2006.01)
*A01C 7/02* (2006.01)

(52) U.S. Cl.
USPC .............................................. 111/95; 111/900

(58) Field of Classification Search
USPC ................. 111/89, 92–117, 200, 900
See application file for complete search history.

(56) References Cited

U.S. PATENT DOCUMENTS 3,432,075 A * 3/1969 Holzhei Don Earl et al. ............................ 221/178

8,286,567 B2 * 10/2012 Garrett .......................... 111/200

* cited by examiner

*Primary Examiner* — Christopher J Novosad
(74) *Attorney, Agent, or Firm* — Thorpe North & Western LLP

(57) ABSTRACT

A manually operable seeding device comprises an elongate body portion having a trough section formed therein, and a plurality of openings formed through the body portion in or adjacent the trough section. The plurality of openings is spaced one from another a distance that corresponds to a spacing at which it is desired that plants germinating from the seeds will grow. A method of manually seeding a plant bed is also provided, including: obtaining a seeding device that comprises an elongate body portion having a trough section formed therein and a plurality of openings formed through the body portion in or adjacent the trough section; positioning the seeding device atop or partially below the ground surface; and delivering at least one seed through each of the openings to bed the seed within or atop the ground surface.

13 Claims, 5 Drawing Sheets

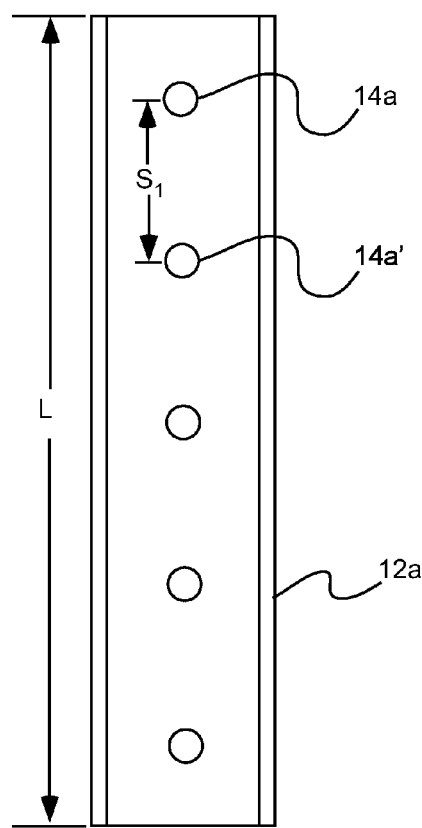
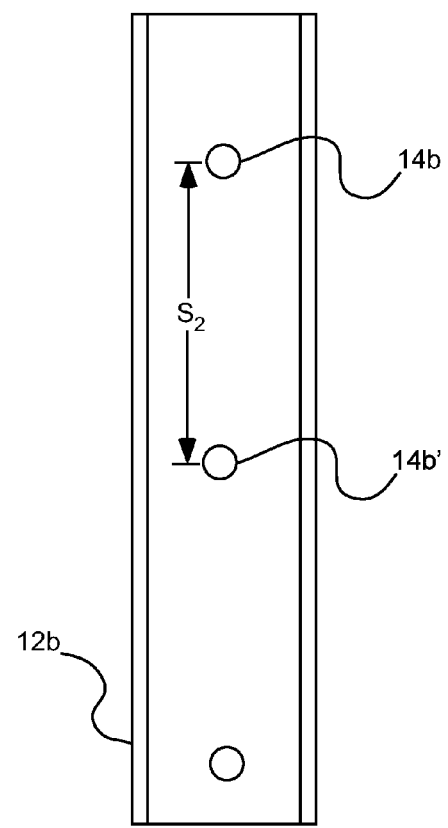
FIG. 2      FIG. 3

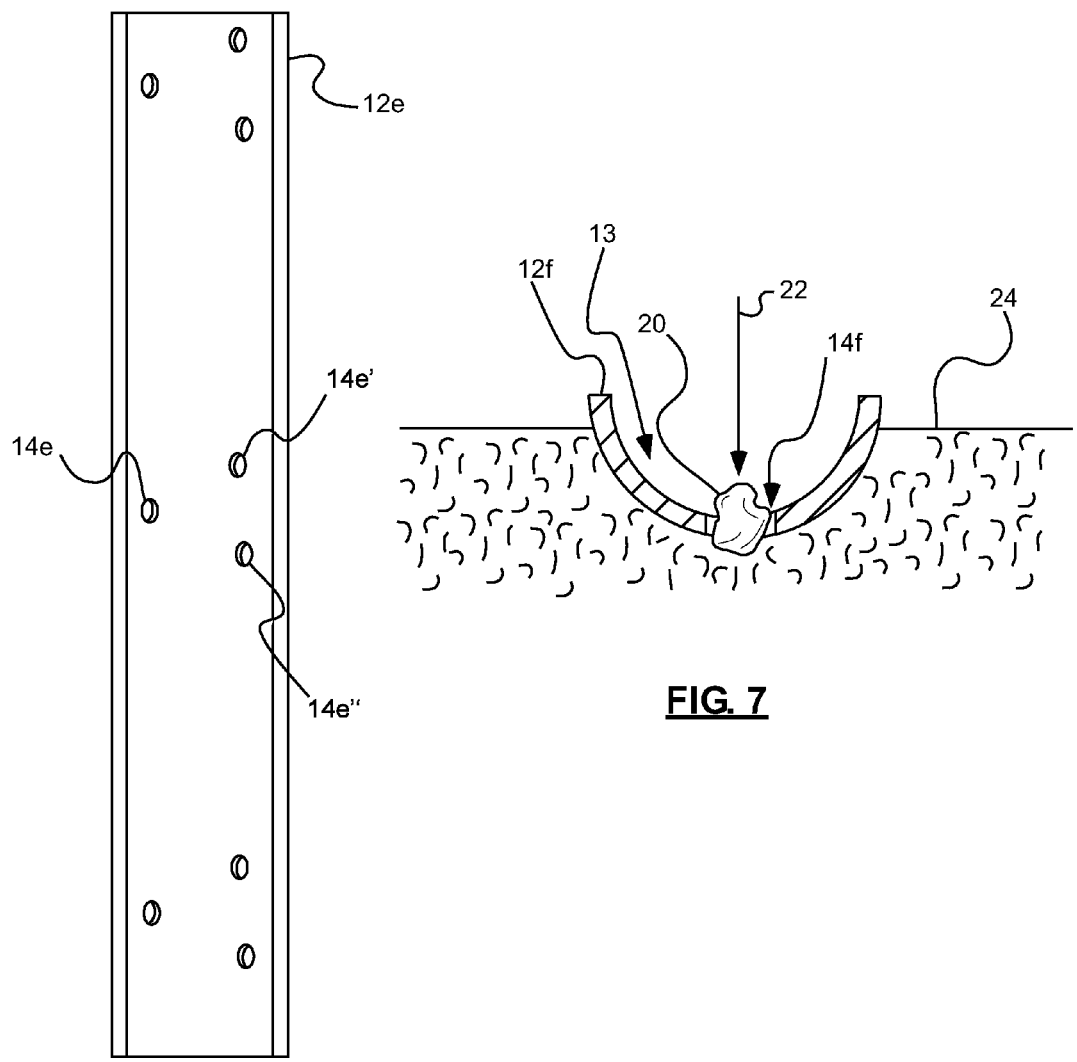

MANUALLY OPERATED SEEDING DEVICE AND ASSOCIATED METHODS

BACKGROUND OF THE INVENTION

1. Field of the Invention

The present invention relates generally to devices for use in planting or sowing seeds of various kinds. More particularly, the present invention relates to such devices that are manually operated.

2. Related Art

It is often the case that seeds are manually planted directly into earthen areas in which the resultant plants will exist until harvested or removed. Most such plants perform better if the seeding process includes proper spacing of the seeds one from another. While such spacing can be done by estimation (and nearly always is), it is often the case that such efforts result in an overuse of seed, and/or improperly spaced plants, and/or an overabundance of plant sprouts that must be thinned later. Each of these results is undesirable for reasons of economy and optimal plant health.

SUMMARY OF THE INVENTION

In accordance with one aspect of the invention, a manually operable seeding device is provided, including an elongate body portion having a trough section formed therein. A plurality of openings can be formed through the body portion in or adjacent the trough section. The plurality of openings can be spaced one from another a distance that corresponds to a spacing at which it is desired that plants germinating from the seeds will grow.

In accordance with another aspect of the invention, a method of manually seeding a plant bed is provided, including: obtaining a seeding device that comprises an elongate body portion having a trough section formed therein and a plurality of openings formed through the body portion in or adjacent the trough section; positioning the seeding device atop or partially below the ground surface; and delivering at least one seed through each of the openings to bed the seed within or atop the ground surface.

In accordance with another aspect of the invention, a method of manually seeding a plant bed is provided, including: obtaining a seeding device that comprises an elongate body portion having a trough section formed therein and a plurality of openings formed through the body portion in or adjacent the trough section; manually forming a furrow in the plant bed; manually positioning the seeding device within the furrow; and manually delivering at least one seed through each of the openings to bed the seed within or atop the ground surface.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

The following drawings illustrate exemplary embodiments for carrying out the invention. Like reference numerals refer to like parts in different views or embodiments of the present invention in the drawings.

FIG. 2 is a top view of a seeding device in accordance with an embodiment of the invention;

FIG. 3 is a top view of another seeding device in accordance with an embodiment of the invention, having seed openings spaced differently than those of FIG. 2;

FIG. 6 is a top view of another seeding device in accordance with an embodiment of the invention, having a plurality of seed openings grouped near seeding nodes;

FIG. 7 is a sectioned end view of an exemplary seeding device in accordance with an aspect of the invention, shown positioned adjacent a ground surface and having a seed within an opening of the seeding device.

DETAILED DESCRIPTION

Figure 1:
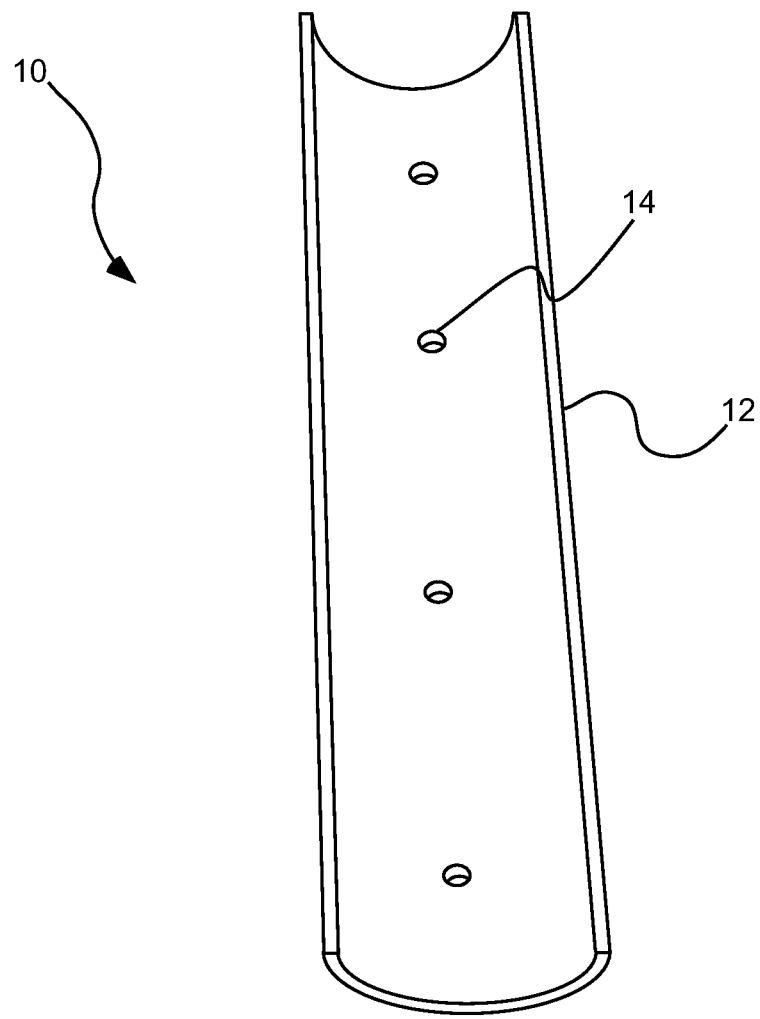
FIG. 1 is a perspective view of an exemplary seeding device in accordance with an embodiment of the invention.

Before the present invention is disclosed and described, it is to be understood that this invention is not limited to the particular structures, process steps, or materials disclosed herein, but is extended to equivalents thereof as would be recognized by those of ordinarily skilled in the relevant arts. It should also be understood that terminology employed herein is used for the purpose of describing particular embodiments only and is not intended to be limiting.

It must be noted that, as used in this specification and the appended claims, the singular forms "a" and "the" can include plural referents, unless the context clearly dictates otherwise. Thus, for example, reference to an "opening" can include reference to one or more of such openings.

DEFINITIONS

In describing and claiming the present invention, the following terminology will be used in accordance with the definitions set forth below.

As used herein, the term "manual" or "manually" is to be understood to refer to an operation that is carried out by a user in a manner that requires no tools or equipment other than the user himself. In other words, an operation that is performed manually is performed "by hand" by the user. Manually performed operations are to be considered to include operations that do not utilize machinery, tools or equipment other than those devices claimed or described.

As used herein, the term "seed" is to be understood to refer to any type of grain or ripened ovule of a plant that has the ability to germinate into a plant. Examples of seeds with which the present invention is suitable for use include, without limitation, vegetable seeds, bean or legume seeds, flower seeds, and the like, as would be appreciated by one of ordinary skill in the art having possession of this disclosure.

Relative directional terms, such as "upper," "lower," "top," bottom," etc., can be used herein to aid in describing various features of the present system. It is to be understood that such terms are generally used in a manner consistent with the understanding one of ordinary skill in the art would have of such systems. Such terms should not, however, be construed to limit the present invention.

As used herein, the term "substantially" refers to the complete, or nearly complete, extent or degree of an action, characteristic, property, state, structure, item, or result. As an arbitrary example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. As another arbitrary example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

Distances, forces, weights, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 1 inch to about 5 inches" should be interpreted to include not only the explicitly recited values of about 1 inch to about 5 inches, but also include individual values and sub-ranges within the indicated range. Thus, included in this numerical range are individual values such as 2, 3, and 4 and sub-ranges such as from 1-3, from 2-4, and from 3-5, etc.

This same principle applies to ranges reciting only one numerical value and should apply regardless of the breadth of the range or the characteristics being described.

Invention

The present invention relates generally to devices that aid users in properly and efficiently bedding seeds in a ground area such as a vegetable garden, flower garden and the like. While not so required, in one embodiment the devices and methods are suitable for use manually by a user, without requiring the use of extraneous equipment, vehicles, tools and the like. As generally illustrated in FIG. 1, in one aspect a manually operable seeding device 10 is provided. The seeding device can include a generally elongate body portion 12 that can have a trough section formed therein (the trough section is illustrated at 13 in FIGS. 7 and 8). A plurality of openings 14 can be formed through the body portion in or adjacent the trough section. The plurality of openings can be spaced one from another a distance that corresponds to a spacing at which it is desired that plants germinating from the seeds will grow.

FIG. 7 illustrates the seeding device in use adjacent an earthen area 24. In this embodiment, the body portion 12$f$ rests within a furrow or trench formed in the earthen area. Seed 22 is shown extending through opening 14$f$. In a typical application, the body portion will be positioned as shown, and one or more seeds will be deposited within each opening formed in the trough section. For example, the seeding device 12 of FIG. 1 includes four seed openings, generally positioned to represent four seed nodes. Once positioned adjacent to (or pressed into) the earthen surface, one or more seeds will be deposited within each of the four openings. Depending upon the size of the seed being bedded, and the thickness of the seeding device, the seed or seeds that are deposited within an opening can be partially or fully embedded in the earth immediately below the opening. Once each seed node has been seeded, the seeding device can be lifted from the earthen surface, and the seeds can be covered by additional earthen material.

The present invention thus advantageously allows a user to manually plant or bed seeds in a manner that allows very accurate placement of seeds with little to no measurement required beforehand. The resultant process can improve the overall gardening experience by reducing overseeding, reducing the need to later thin a great deal of plant sprouts, and providing the proper spacing between plants to allow the plants to mature into full size.

While not so required, the trough section can include a generally arcuate cross section, with a smooth yet gradually curved upper surface. In this manner, a user can easily run his or finger along the bottom of the trough section to force one or more seeds into a bed. In other embodiments, the trough section can include a substantially half-circular cross section (e.g., it can be formed in a generally U"-shaped cross section, or half-cylinder cross section). In another embodiment, the cross section can include at least two substantially planar walls that terminate at a corner of the trough section (e.g., that form a ridge or corner or similar shape at the bottom of the upper surface of the trough).

The seeding device can be formed from a variety of materials and in a variety of configurations. In one example, the seeding device is formed from PVC pipe cut lengthwise into trough sections. The diameter or width of the trough can vary depending upon a number of factors, including the type of seed being planted, etc. In addition to polymeric material, the seeding device can also be formed of lightweight metallic materials, such as aluminum, sheet metal, etc. In one exemplary configuration, the seeding device can be provided to consumers in manageable lengths, such as two-to-three feet in overall length. In one embodiment, the seeding devices can be formed in lengths of about twenty-three inches.

Figure 4:
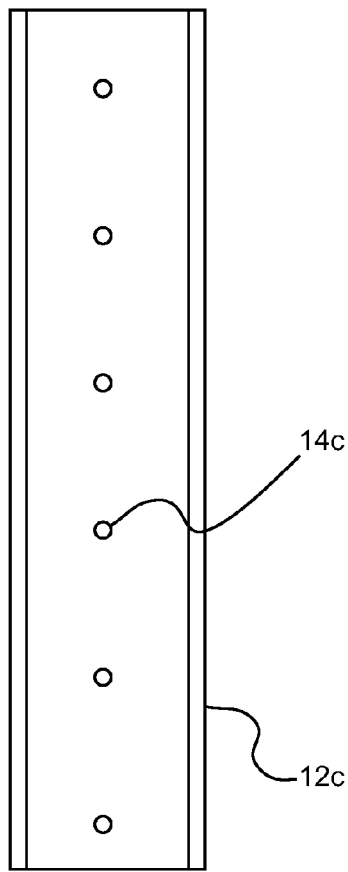
FIG. 4 is a top view of another seeding device in accordance with an embodiment of the invention, having seed openings with smaller diameter than those of FIG. 2.
Figure 5:
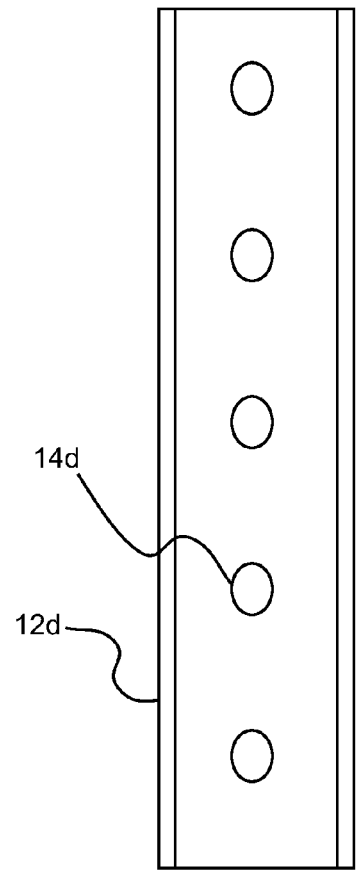
FIG. 5 is a top view of another seeding device in accordance with an embodiment of the invention, having seed openings shaped differently than those of FIG. 2.

The present invention can provide seeding devices that are advantageously tailored to specific requirements for specific seeds. As shown in FIGS. 2 and 3, the spacing between adjacent openings in a trough section can be varied to provide optimal results for a particular plant. For example, the spacing $S_1$ of openings 14$a$ and 14$a'$ is much closer than the spacing S2 of openings 14$b$ and 14$b'$. Some plants are better suited to be spaced further distances from one another during germination and growth. Where greater spacing is not required or desirable, openings that are positioned closer to one another may be advantageous, to provide the most compact planting arrangement possible. Similarly, as shown by example in FIG. 4, the size of the openings 14$c$ can be varied, to account for differently sized seeds. For example, very small seeds, such as carrot seeds, lettuce seeds, onion seeds, celery seeds, seeds from herbs, etc., might best be planted using openings with very small diameters. Also, as shown in FIG. 5, the shape of the opening 14$d$ can be varied, to account for seed types that have unusual shapes, such as beans and legumes.

In the embodiment shown in FIG. 6, the seeding device 12$e$ can include openings that are grouped around seed nodes. In this example, three seed nodes are provided, each with three openings 14$e$, 14$e'$ and 14$e''$ arranged thereby. This arrangement can be beneficial for plants that perform best when planted in mounds or groups, such as corn.

Figure 8:
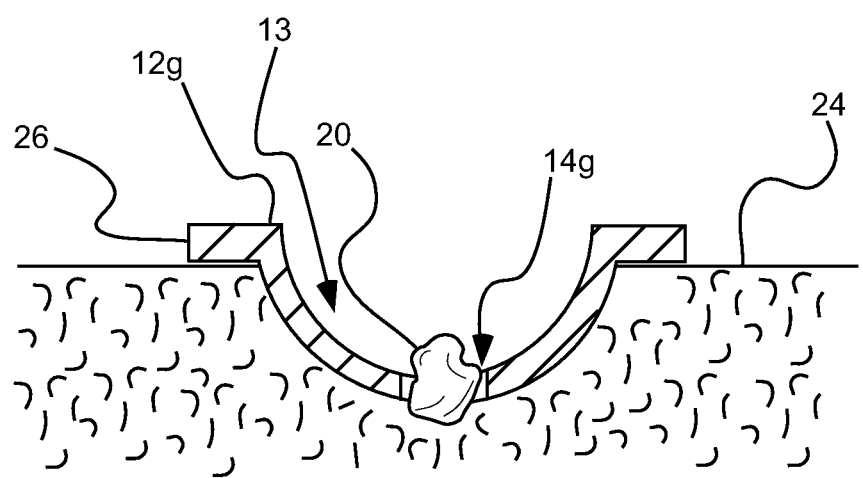
FIG. 8 is a sectioned end view of another embodiment of the seeding device of FIG. 7, having support flanges extending therefrom.

In the embodiment illustrated in FIG. 7, the seeding device 12$f$ is formed in a simple "half-pipe," having a "u-shaped"

channel configuration. However, as shown in FIG. 8, the through section of the seeding device can form a part of a larger device. In the example shown, the seeding device 12g includes a pair of support flanges 26 that can serve to limit downward movement of the seeding device into the earthen material, to more accurately control a depth at which the seeds are planted.

In addition to the structural features discussed above, the present invention also provides a method of manually seeding a plant bed. The method can include obtaining a seeding device as shown and described above, and positioning the seeding device atop or partially below the ground surface. Once positioned, at least one seed can be positioned in or delivered through each of the openings to bed the seed within or atop the ground surface. The method can include at least partially embedding the seed in the ground surface immediately below the opening while the seeding device remains in position relative to the earthen material. All of the steps of the method can be performed manually by a user, without requiring the use of extraneous tools or equipment.

In one aspect, the method can be streamlined by depositing a cluster (e.g., "pile") of seeds within the trough of the seeding device (in one embodiment, the cluster can be deposited adjacent one end of the seeding device). After the cluster is positioned, a user can manually move or slide the cluster down the length of the trough (or back-and-forth within the trough, as may be necessary for any particular seeding application). As the cluster is moved across each opening, one or more seeds from the cluster is deposited in each opening.

While not so required, in some applications it can be desirable to form a furrow in the earthen material to allow the seeding device to more easily extend below the upper surface of the earthen bed. Due to the relatively small size of the seeding devices, a user can easily form such a furrow, using either his or her hands, or a small implement such as a hand shovel or broomstick, or the edge of the seeding device itself.

As discussed above, the relative spacing and size of the openings can vary, as dictated by any particular application. While not so limited, the following are examples of openings sizes and spacing that can be utilized in the present invention: openings sized with a diameter of about 3/16 of an inch or 1/8 of an inch can be spaced about 3 inches from one another. The opening sizes can range from about 3/16 of an inch to about 3/8 of an inch. In one aspect of the invention, the width of the trough section of the seeding device can vary in relation to the size of the openings: for example, a seeding device with smaller sized openings can include a trough width that is smaller than a seeding device with larger sized openings. This aspect of the invention can be advantageous in both rendering it easier to manipulate smaller seeds along a smaller trough surface, and can increasing the efficiency with which multiple seeding devices can be stacked atop (or within) on another for packaging into a kit.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the examples.

I claim:

1. A method of manually seeding a plant bed, comprising:
   obtaining a seeding device that comprises an elongate body portion having a trough section formed therein and a plurality of openings formed through the elongate body portion in or adjacent the trough section;
   positioning the seeding device atop or partially below a ground surface; and
   delivering at least one seed through each of the openings to bed the at least one seed within or atop the ground surface.

2. The method of claim 1, wherein delivering the at least one seed through an opening includes at least partially embedding the at least one seed in the ground surface immediately below the opening.

3. The method of claim 1, wherein positioning the seeding device and delivering the at least one seed are performed manually by a user.

4. The method of claim 1, wherein delivering the at least one seed through each of the openings includes:
   depositing a cluster of seeds within the trough section of the seeding device; and
   manually moving the cluster across the openings in the seeding device to deposit one or more seeds from the cluster in each opening.

5. The method of claim 1, further comprising forming a furrow in the plant bed prior to positioning the seeding device; and
   positioning the seeding device within the furrow formed in the plant bed.

6. The method of claim 1, wherein the trough section of the seeding device includes an arcuate upper surface.

7. The method of claim 1, wherein the trough section of the seeding device includes a substantially u-shaped cross section.

8. A method of manually seeding a plant bed, comprising:
   obtaining a seeding device that comprises an elongate body portion having a trough section formed therein and a plurality of openings formed through the elongate body portion in or adjacent the trough section;
   manually forming a furrow in a plant bed;
   manually positioning the seeding device within the furrow; and
   manually delivering at least one seed through each of the openings to bed the at least one seed within or atop a ground surface.

9. The method of claim 8, wherein delivering the at least one seed through an opening includes at least partially embedding the at least one seed in the ground surface immediately below the opening.

10. The method of claim 8, wherein the seeding device is selected from a plurality of manually operable seeding devices assembled as a kit.

11. The method of claim 8, wherein delivering the at least one seed through each of the openings includes:
    depositing a cluster of seeds within the trough section of the seeding device; and
    manually moving the cluster across the openings in the seeding device to deposit one or more seeds from the cluster in each opening.

12. The method of claim 8, wherein the trough section of the seeding device includes a substantially u-shaped cross section.

13. The method of claim 8, wherein the trough section of the seeding device includes an arcuate upper surface.

* * * * *